United States Patent
Sarkissian

(10) Patent No.: US 10,638,332 B2
(45) Date of Patent: Apr. 28, 2020

(54) SYSTEM AND METHOD FOR INCREASING CELLULAR SITE CAPACITY

(71) Applicant: Haig A. Sarkissian, Cornwall-on-Hudson, NY (US)

(72) Inventor: Haig A. Sarkissian, Cornwall-on-Hudson, NY (US)

(*) Notice: Subject to any disclaimer, the term of this patent is extended or adjusted under 35 U.S.C. 154(b) by 0 days.

(21) Appl. No.: 16/549,274

(22) Filed: Aug. 23, 2019

(65) Prior Publication Data

US 2019/0380047 A1 Dec. 12, 2019

Related U.S. Application Data

(62) Division of application No. 15/496,501, filed on Apr. 25, 2017, now Pat. No. 10,412,599.

(60) Provisional application No. 62/327,815, filed on Apr. 26, 2016.

(51) Int. Cl.
| | | |
|---|---|---|
| *H04W 16/28* | (2009.01) | |
| *H04W 24/10* | (2009.01) | |
| *H04J 11/00* | (2006.01) | |
| *H04L 5/00* | (2006.01) | |

(52) U.S. Cl.
CPC .......... *H04W 16/28* (2013.01); *H04J 11/005* (2013.01); *H04L 5/0048* (2013.01); *H04W 24/10* (2013.01)

(58) Field of Classification Search
CPC .............................. H04W 16/28; H04L 5/0048
See application file for complete search history.

(56) References Cited

U.S. PATENT DOCUMENTS

| | | | |
|---|---|---|---|
| 7,437,159 B1 | 10/2008 | Yarkosky et al. | |
| 2001/0034236 A1 | 10/2001 | Tong et al. | |
| 2006/0164969 A1 | 7/2006 | Malik et al. | |
| 2010/0142462 A1 | 6/2010 | Wang et al. | |
| 2010/0197314 A1* | 8/2010 | Maaref ............... | H04W 16/04 455/450 |
| 2010/0203892 A1* | 8/2010 | Nagaraja ............ | H04W 36/30 455/437 |
| 2012/0040696 A1* | 2/2012 | Siomina ............. | G01S 5/0036 455/456.6 |
| 2013/0343302 A1 | 12/2013 | Kim et al. | |
| 2015/0318904 A1 | 11/2015 | Lee et al. | |

OTHER PUBLICATIONS

International Search Report and Written Opinion for related application No. PCT/US2017/029608, dated Aug. 9, 2017.

* cited by examiner

*Primary Examiner* — Joshua L Schwartz
(74) *Attorney, Agent, or Firm* — Procopio, Cory, Hargreaves & Savitch LLP

(57) ABSTRACT

Systems and methods for providing wireless services to a plurality of user equipments (UEs) is disclosed. A device can have a plurality of antennas, each having two or more beams. The plurality of antennas can divide the coverage area into sectors based on the two or more beams of each antenna, and each beam can overlap with a beam in an adjacent sector. The device can transmit a reference signal in each sector via the associated beam, received one or more measurement reports from UEs within each sector, indicating a received quality of at least one reference signal. The device can assign a sector edge UE to a sector based on the measurement report.

17 Claims, 10 Drawing Sheets

SYSTEM AND METHOD FOR INCREASING CELLULAR SITE CAPACITY

CROSS REFERENCE TO RELATED APPLICATIONS

This application is a divisional application of U.S. Non-provisional patent application Ser. No. 15/496,501, filed Apr. 25, 2017, entitled "SYSTEM AND METHOD FOR INCREASING CELLULAR SITE CAPACITY," which claims the benefit of Provisional Patent Application 62/327,815, filed Apr. 26, 2016, entitled, "SYSTEM AND METHOD FOR INCREASING CELLULAR CAPACITY," the contents of which are hereby incorporated by reference in their entirety.

BACKGROUND

Technical Field

This disclosure generally relates to wireless communication. More specifically, this disclosure relates to increasing wireless capacity of cellular systems. This disclosure relates to multi-cell, multi-subscriber wireless systems and various methods for interference mitigation to increase the capacity of a cell site and enhance the throughput of cell edge users.

Related Art

Wireless communication systems are widely deployed to provide various types of communication content such as voice, data, video, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal can communicate with at least one base station (BS) via transmissions on the forward and reverse links. The forward link (or downlink) refers to the communication link from the base stations to the terminals, and the reverse link (or uplink) refers to the communication link from the terminals to the base stations. The base stations can also be referred to as node B's or evolved node B's (eNB). The eNB or BS can also be termed an access point (AP).

A wireless communication network can include a number of base stations that can support communication for a number of wireless devices or wireless terminals. A wireless device can be a user equipment (UE), for example, in a LTE environment. A UE is a device that can provide wireless services to a user. Some examples of UEs include cellular phones, smart phones, personal digital assistants (PDAs), wireless modems, handheld devices, tablets, phablets, laptop computers, netbooks, smartbooks, and ultrabooks, among other examples.

SUMMARY

In general, this disclosure describes systems and methods related to the interference mitigation in base stations having multi-beam directional antennas. The systems, methods and devices of this disclosure each have several innovative aspects, no single one of which is solely responsible for the desirable attributes disclosed herein.

One aspect of the disclosure provides method for reducing inter-sector interference for a base station having one or more multi-beam antennas each, the one or more multi-beam antennas having two or more beams and the base station having a coverage area. The method can include dividing the coverage area into sectors based on one or more beams associated with each antenna. Each beam can be associated with a sector. Each sector can have a sector edge bordering an adjacent sector, the sectors being arranged radially around the base station. The method can include transmitting a reference signal via each beam to one or more user equipments (UEs) in each sector, each sector having a reference signal. The method can include receiving, at a transceiver coupled to the multi-beam antenna, one or more measurement reports from the plurality of UEs. The one or more measurement reports can indicate receive quality of at least one reference signal. The method can include determining that at least one UE of the plurality of UEs is a sector edge UE located at a sector edge of one or more of the sectors, based on the one or more measurement reports. The method can include assigning, based on the determining, the sector edge UE to a sector having a higher receive quality of the at least one reference signal.

Another aspect of the disclosure provides a non-transitory computer-readable medium comprising instructions for reducing inter-sector interference for a base station having one or more multi-beam antennas, the one or more multi-beam antennas having two or more beams and the base station having a coverage area. When executed by a computer the instructions cause the computer to divide the coverage area into sectors based on one or more beams associated with each antenna. Each beam can be associated with a sector. Each sector can have a sector edge bordering an adjacent sector, the sectors being arranged radially around the base station. The instructions cause the computer to transmit a reference signal via each beam to one or more user equipments (UEs) in each sector. Each sector can have a reference signal. The instructions cause the computer to receive, at a transceiver coupled to the multi-beam antenna, one or more measurement reports from the plurality of UEs. The one or more measurement reports can indicate receive quality of at least one reference signal. The instructions cause the computer to determine that at least one UE of the plurality of UEs is a sector edge UE located at a sector edge of one or more of the sectors, based on the one or more measurement reports. The instructions cause the computer to assign, based on the determining, the sector edge UE to a sector having a higher receive quality of the at least one reference signal.

Another aspect of the disclosure provides a system for reducing inter-sector interference for a base station. The system can have a plurality of antennas dividing the coverage area into sectors based on one or more beams associated with each antenna of the plurality of antennas. Each beam can be associated with a sector. Each sector can have a sector edge bordering an adjacent sector. The sectors can be arranged radially around the base station. The system can have at least one transmitter coupled to the plurality of antennas. The at least one transmitter can transmit a reference signal via each beam to one or more user equipments (UEs) in each sector, each sector having a reference signal. The system can have at least one receiver coupled to the plurality of antennas. The at least one receiver can receive one or more measurement reports from the plurality of UEs, the one or more measurement reports indicating receive quality of at least one reference signal. The system can have one or more processors coupled to the transmitter and the receiver. The one or more processors can determine that at least one UE of the plurality of UEs is a sector edge UE located at a sector edge of one or more of the sectors, based on the one or more measurement reports. The one or more processors can assign, based on the determining, the sector edge UE to a sector having a higher receive quality of the at least one reference signal.

Other features and advantages of the present disclosure should be apparent from the following description which illustrates, by way of example, aspects of the disclosure.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
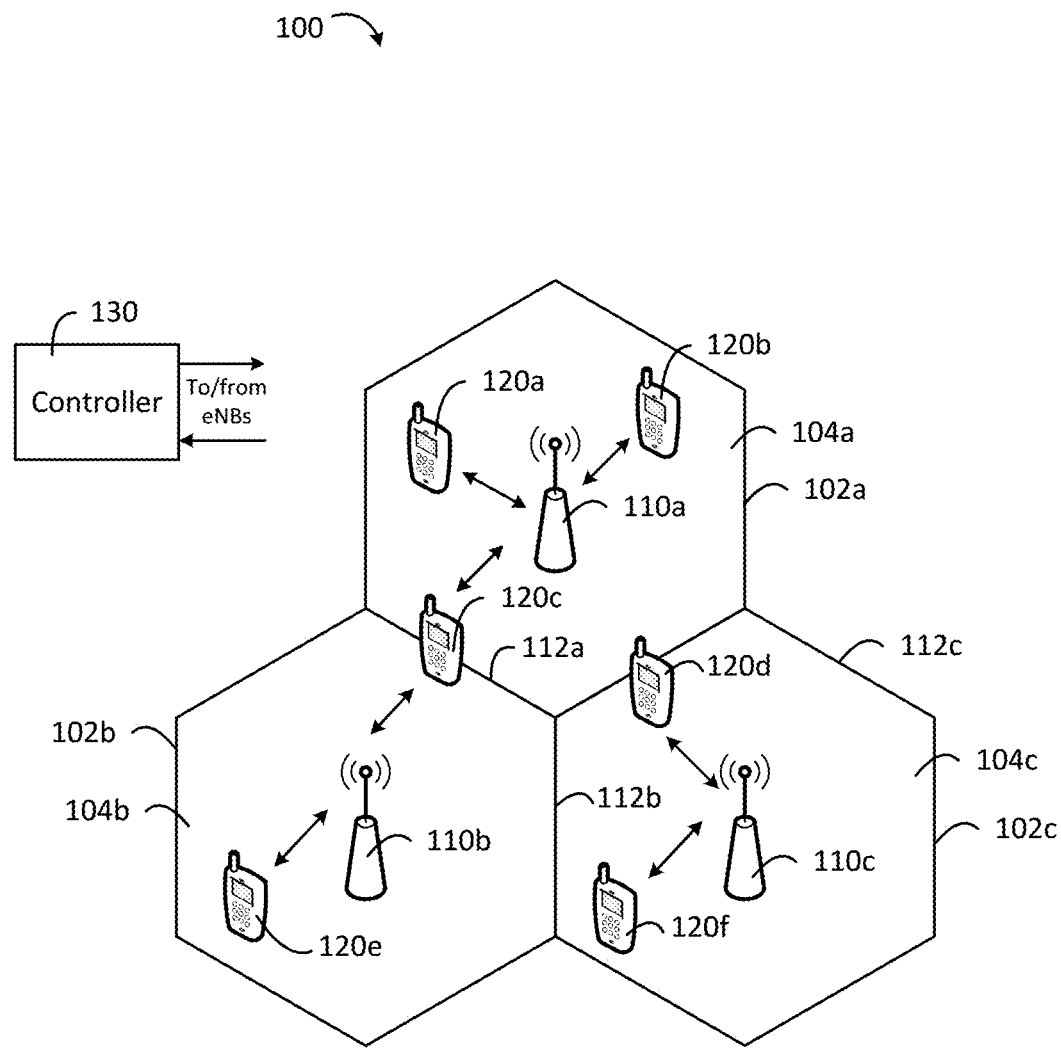
FIG. 1 is a graphical representation of a wireless communication system.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure may be practiced without these specific details. In some instances, well-known structures and components are shown in simplified form for brevity of description.

This disclosure describes a method and apparatus for increasing the capacity of a cell site and enhancing the throughput of cell edge users. The disclosed systems and methods can include replacement of existing single beam antennas with a dual beam (or poly beam) antenna of equivalent form factor or size, shape, and weight. Each beam of the dual beam antenna can have a narrower beam width roughly equal to half the beam width of the antenna it replaces. When multi-beam antennas are used, each beam of the multi-beam antenna can have a narrower beam width roughly equal to 1/K the beam width of the antenna it replaces, where K is the number of beams in a multi-beam antenna. By connecting an eNB radio and modem to each of the beams, the device of this disclosure can increase the tonnage delivering capacity (measured in Gigabytes (GB)) of a site, without incurring the cost of erecting a new site or spectrum acquisition. In some cases the tonnage capacity and be increased by two or more times.

Some advantages can be achieved using a dual beam (or multi-beam) antennas with the same form factor as an existing single beam antenna. For example, if only mere replacement of the antennas is required, no approval from municipalities may be required when replacing an antenna with a similar size antenna. Additionally, wind loading of the new (dual or multi-beam) antenna would be the same as the wind loading of the old (single beam) antenna. Therefore, it would be easier to replace the old with the new. Moreover, if the weight of the new (dual or multi-beam) antenna is the same, then site surveys or engineering studies can be accelerated or eliminated, thereby saving time and cost and speeding deployment and upgrades.

The disclosure further provides a method and apparatus to enhance the coordination between adjacent sectors of one or more BSs, so that the throughput, measured in Megabits per second (Mbps), delivered to UEs at the edge of a cell are equivalent to that of UEs at the center of a cell. This can be accomplished by measuring different physical cell identities (PCIs) and relative signal strength to determine an optimum serving cell or serving sector. This can also be accomplished by mapping UEs using signal strength or their geographic positions and allocating each UE to the optimum serving sector/cell based on their relative location and based on the relative interference experienced from two adjacent sectors. The invention further describes the means to classify UEs as "center cell" UEs for which no coordination is necessary, and "cell edge" UEs for which coordination may be needed.

Some networks can broadcast synchronization signals from the BS (e.g., an eNB) to the UE in the downlink direction. The synchronization signal, also known as Cell Reference Signal (CRS) or simply Reference Signals (RS) can be used by UEs to identify their respective serving cells (e.g., BS). The synchronization signals are made up of Primary Synchronization Signals (PSS) and Secondary Synchronization Signals (SSS), and when combined make up the PCI of a cell The systems and methods described herein may be used for various wireless communication networks such as CDMA, TDMA, FDMA, OFDMA, SC-FDMA, LTE, LTE-Advanced and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The systems and methods described herein may be used for the wireless networks and radio technologies mentioned above as well as other wireless networks and radio technologies. For clarity, certain aspects of the techniques are described below for LTE, and LTE terminology is used in much of the description below. This is not intended to be limiting as the principles, improvements, and advantages of this disclosure may be applicable in other communication protocols.

Evolved NodeBs (eNBs) (e.g., a BS) of a network may be pooled together as virtual cells so that they can be treated as one large resource by network managers and users. Each virtual cell may include a group of physical cells that may jointly serve a UE. A virtual cell may include a Remote Radio Unit (RRU) with a centralized Baseband Unit (BBU) that controls the RRUs. In some cases the virtual cell may be made up of a set of All-In-One eNB's which combine an RRU and a BBU but are associated with one another through a controller (see below) which performs the coordination between the individual all-in-one eNB's.

FIG. 1 is a graphical representation of a wireless communication system. A wireless communication system (system) 100 can be, for example, a cellular network. In some embodiments, the system 100 can be an LTE network.

The system 100 can include a number of evolved NodeBs (eNBs) 110 and various other network entities. FIG. 1 depicts eNBs 110a, 110b, 110c, that can be referred to collectively as eNBs 110. The eNBs 110 can be a base station (BS) or access point (AP) that communicates with one or more UEs 120. The eNBs 110 can also be Node B's, which are another example of a station that communicates with the UEs 120. UEs 120a, 120b, 120c, 120d, 120e, 120f are shown and can be collectively referred to as UEs 120. The UEs 120 can also be referred to a mobile terminals, user terminals, and handsets, and can refer to a wireless-enabled mobile communication device.

Each of the eNBs 110 can provide communication coverage for a particular geographic area. In 3GPP, the term "cell" can refer to a coverage area of an eNB 110 and/or an eNB subsystem serving this coverage area, depending on the context in which the term is used. In some embodiments, the system 100 can have one or more cells 102. Three cells 102 are shown as cell 102a, cell 102b, and cell 102c. Each of the cells can have a respective coverage area 104 to provide wireless services to the UEs 120 within. In general, the cell 102 refers to the area served by the eNB 110. The coverage area 104 can be a designated area surrounding the eNB 110 in which a usable signal is available to the UEs 120. Additionally, the cells 102 providing service to various UEs 120 within the coverage areas 104 can be "serving cells."

The system 100 can have a number of eNBs 110 that can support communication for a number of the UEs 120. For example, the UE 120a can communicate with the eNB 110a via the downlink and uplink. The downlink (or forward link) refers to the communication link from the eNB 110a to the UE 120a, and the uplink (or reverse link) refers to the communication link from the UE 120a to the eNB 110a.

The wireless network 100 may be a heterogeneous network that includes eNBs 110 of different types, such as for example, macro eNodeBs, pico eNodeBs, femto eNodeBs, relays, etc. These different types of eNBs 110 can have different transmit power levels, different coverage areas 104, and different impact on interference in the wireless network 100. For example, macro eNBs 110 may have a high transmit power level (e.g., 20 Watts) whereas pico cells, femto cells, and relays may have a lower transmit power level (e.g., 1 Watt).

The system 100 can support synchronous or asynchronous operation. For synchronous operation, the eNBs 110 may have similar frame timing, and transmissions from different eNBs 110 can be approximately aligned in time. For asynchronous operation, the eNBs 110 can have different frame timing, and transmissions from those different eNBs 110 may not be aligned in time.

A controller 130, depicted as a functional block, can be capable of communication with, or otherwise coupled to, a set of the eNBs 110 and provide coordination and control for these eNBs 110. The controller 130 can communicate with the eNBs 110 via a backhaul connection, for example. The eNBs 110 can also communicate with one another, for example, directly or indirectly via wireless or wireline backhaul communication networks. As described herein, functions described as being performed by the eNB 110 can be performed, or partly performed by the controller 130 and vice versa.

In some embodiments, certain of the UEs 120 can move within a respective cell or may move from cell to cell. For example, the UE 120c can be at a cell edge 112a between the cell 102a and the cell 102b. A cell edge 112b can lie between the cell 102b and the cell 102c. A cell edge 112c can lie between the cell 102c and another cell 102 not shown in the system 100. Not all cell edges 112 are labeled for ease of description and figure clarity. However, as used herein, the cell edges 112 define a "border" or an "overlap area." between adjacent cells 102. The cell edges 112 are areas in which the UEs 120 may be able to receive signals from more than one eNB 110 or experience interfering signals from multiple eNBs 110. The UEs 120 can be dispersed throughout the cells 102 and the system 100, and each of the UEs 120 can be stationary or mobile.

Various interference mitigation methods can be implemented in order to minimize, for example, the interference the UEs 120 experience at the cell edge 112a. In some examples, 4G LTE Advanced interference mitigation techniques, such as, for example. coordinated multipoint (CoMP) systems can be used to send and receive data to and from a UE coordinated by several points to ensure the optimum performance is achieved even at cell edges. CoMP can include a range of different techniques that enable the dynamic coordination of transmission and reception between adjacent cells of different base stations or adjacent sectors of the same BS over a variety of different base stations. The aim is to improve overall quality for the user regardless of their position relative to the cell edges 112 as well as improving the utilization of the network while sharing the same spectrum band. CoMP can turn the inter-cell interference (ICI) into a useful signal, especially at the cell edges 112 where wireless performance may be degraded.

In some embodiments, CoMP can be conducted between cells 102. For example, as the UE 120c approaches the cell edge 112a of the cell 102a as it moves to the cell 102b, the eNB 110a and the eNB 110b can conduct inter-site CoMP. There can be increased interference near the cell edges, so CoMP provides a manner in which the UEs 120 can experience reduced interference, even at the cell edge. Interference mitigation between adjacent cells 102 can also be accomplished through Cell Reference Signal (CRS) Muting and Single Frequency Networks (SFN). These methods are described in more detail below.

Figure 2:
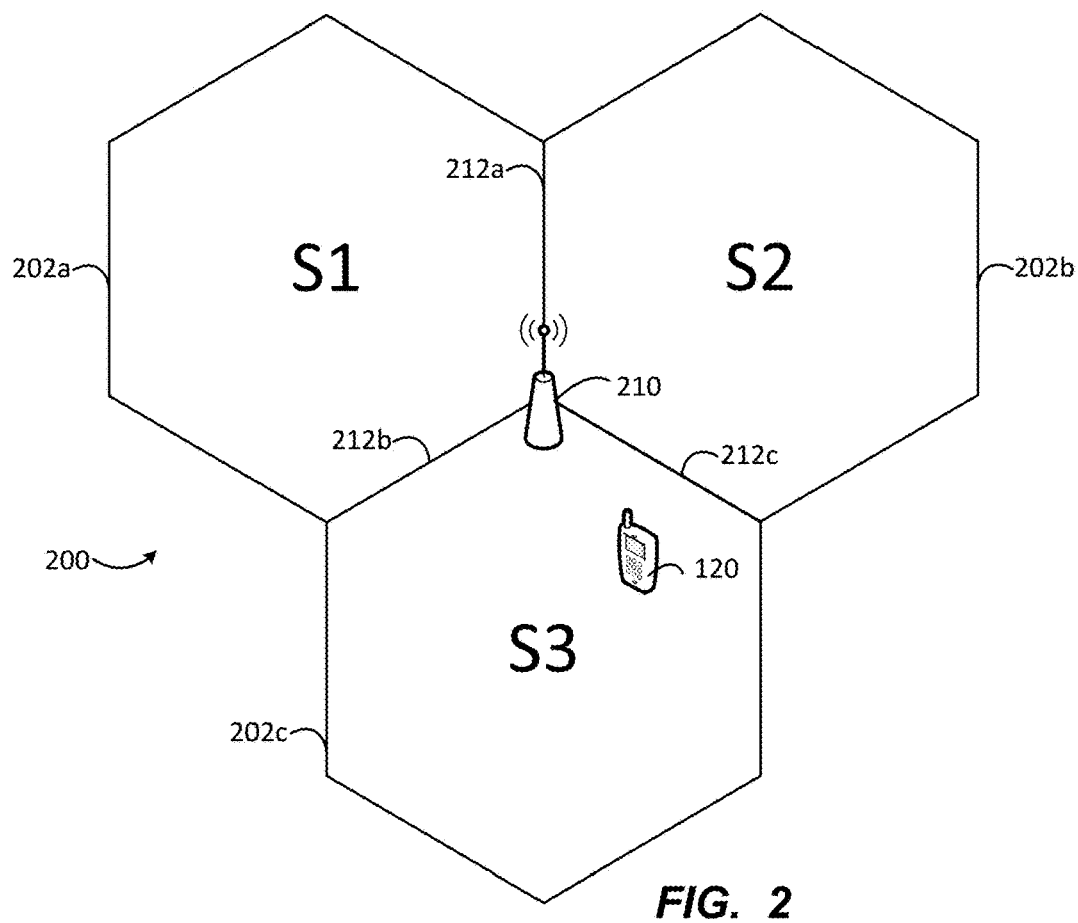
FIG. 2 is a graphical representation of an embodiment of the system of FIG. 1.

FIG. 2 is a graphical representation of an embodiment of the system of FIG. 1 using directional antennas. A cell 200 can represent one or more of the cells 102 of FIG. 1 served by an eNB 210 having directional antennas. Each of the directional antennas can have an associated RRU, providing three RRUs for the cell 200, These three RRUs are collocated at the center of cell 200 where each provides coverage to cells 202a, 202b and 202c respectively.

Using the eNB 210, the cellular map of the system 100 (FIG. 1) can be redrawn with the eNBs 110 located at the points where each of the hexagons describing the coverage areas 104 converge. This is depicted in FIG. 2 and results in three sectors 202 ascribed to the cell 200. Thus the cell 200 can be described in terms of the three sectors 202a, 202b, 202c, each represented as a hexagon.

The eNB 210 can have three directional antennas aimed in three different directions with, for example, 120 degrees associated with each of the three sectors 202 (S1 202a, S2 202b, S3 202c) within the cell 200 (totaling 360 degrees). The eNB 210 can then receive and transmit into the three different sectors at different frequencies, for example. For example, a frequency reuse of n=1 provides the same frequency or channel for use in each sector. A frequency reuse factor of n=3 can provide three non-interfering channels (one in each sector) for use by the UE 120, for example. This is described below in connection with FIG. 3. In some embodiments, the eNB 210 can have three directional antennae each with approximately 120 degrees of coverage. Thus each antenna of the three antennas can be designated to provide service to one of the sectors S1, S2, and S3.

Figure 3:
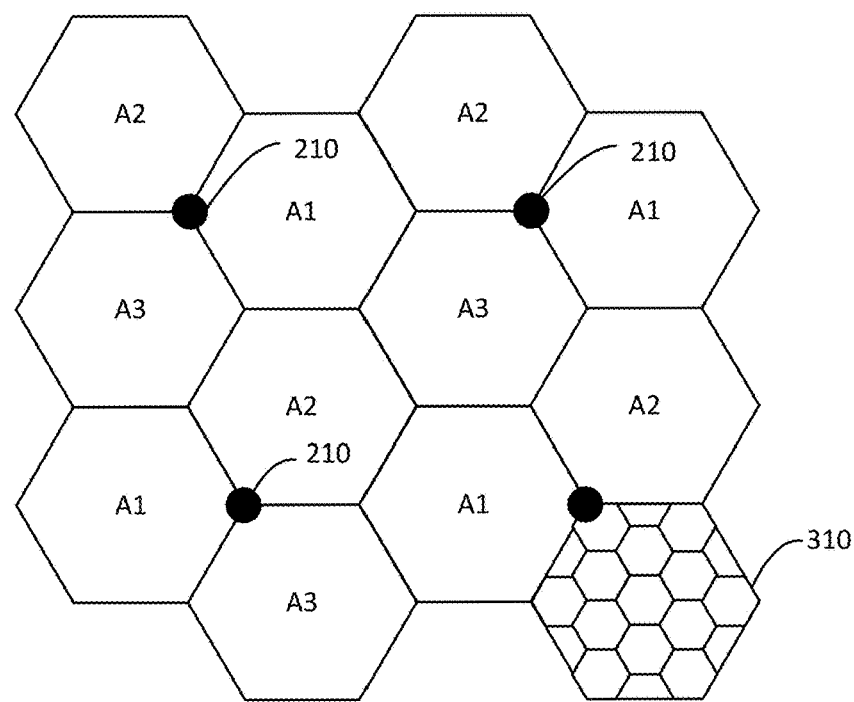
FIG. 3 is a graphical representation of an embodiment of a system using frequency reuse factors according to the system of FIG. 2.

FIG. 3 is a graphical representation of an embodiment of a system using frequency reuse factors according to the system of FIG. 2. The cell 200 and the three sectors (S1, S2, S3) of FIG. 2 can have different frequency reuse factors. In some embodiments, the frequency reuse can be set to three, or n=3, where n is the frequency reuse factor within the system. In such scenario, cell 200 would use three different frequency bands, one for each of sectors S1, S2, and S3. Using three difference frequency bands for the three sectors can minimize or eliminate interference between these sectors at the sector edges. However this can come with an additional cost over using a single frequency band, by having to procure more spectrum, or radiofrequency (RF) bandwidth, for the additional channels/bands. The numbers A1, A2, A3 in FIG. 3 are representative of channel numbers, and can repeat every 3 cells, as shown. In some examples, large cells can be subdivided into smaller cells for high volume congested areas as shown in sector 310. The sector 310 can have smaller subdivisions served by, for example, pico cells or femto cells.

In some embodiments, a frequency reuse of one (1) can also be implemented the system shown in FIG. 3. With frequency reuse of 1, all three sectors (S1, S2, S3) of the eNBs 210 share the same spectrum band. By using the same spectrum band in each sector, wider spectrum bands can be achieved, thereby maximizing the amount of bandwidth used in each sector. However, a frequency reuse factor of one (n=1) introduces interference from sector to sector and from cell to cell. As shown in FIG. 2 for example, the sector 202a and the sector 202b are adjacent, and can overlap, at a sector edge 212a. The sector 202b and the sector 202c can overlap at a sector edge 212c. Similarly, the sector 202c and the sector 202a overlap at a sector edge 212b. The sector edges 212a, 212b, 212c may be referred to collectively as sector edges 212. Certain interference mitigation techniques, such as, for example, CoMP, CSR-muting, and SFN can address interference at the sector edges 212.

In some other embodiments, the frequency reuse factor can be adjusted to mitigate inter-sector interference. For example, by assigning different frequency bands to each of the sectors A1, A2, A3, in FIG. 3, sector-to-sector interference can be mitigated. With frequency reuse of n=3, these three channels A1, A2, A3 can represent three different channels or frequency bands in use for wireless communication within the cells 200.

In some examples, telecommunications providers can deploy voice and data cellular networks over wide inhabited areas. This can allow mobile phones and mobile computing devices to be connected to the public switched telephone network (PSTN) and public Internet. However, as more users consume more data, these networks can become more congested. Nevertheless, a 3-sector configuration of base station (e.g., the eNB 210) antennas can remain, even in new cellular network designs and layouts. In some examples, the three-sided antenna mounting on cellular towers can limit the ability to change from three-sector deployment to multi-sector deployment without using dual bean antennas.

When additional capacity is needed in congested networks, service areas can be further subdivided as shown in the sector 310. Cell division through use of smaller cells can add additional capacity, but it can also come with the cost of new site acquisition, including the need to provision power and backhaul for the new sites. This has certain drawbacks, such as additional capital expense. More sites can also mean more operating expenses for site rental, power, backhaul, and maintenance.

Therefore, it may be desirable to add more sectors to an existing site, in order to enhance the tonnage delivering capacity of a site, without incurring the cost of new site (or additional spectrum bandwidth) acquisition.

In some embodiments, each of the sectors S1, S2, S3 of FIG. 2 can use the same frequencies and bandwidth (e.g., n=1) to provide services in their individual sectors. In 4G LTE, for example, each of the sectors S1, S2, and S3 (FIG. 2) can individually use a 20 MHz bandwidth, and assuming an average spectral efficiency of 3.0 bps/Hz, each sector can have a throughput of approximately 60 megabits per second (Mbps) bitrate with a 27 gigabyte (GB) tonnage delivering capacity per hour. Accordingly, the cell 200 can have an average throughput of 60 megabits per second in each sector, and an aggregate throughput of 3×60 Mbps and a site tonnage of 3×27=81 GB per hour. In some embodiments, it is possible to further subdivide the three sector coverage into more sectors (e.g., 4, 5, 6, etc. sectors), each sector having the same or similar capacity. Adding additional sectors to the cell 200 can proportionally increase the tonnage delivering capacity of the cell 200. Additional sectors can be added by using dual beam and multi beam antennas. This is described below in connection with FIG. 4.

Similar to the system 100, the cell 200 that is subdivided into multiple sectors can conduct intra-site CoMP as the UEs 120 move from sector to sector to mitigate interference at the sector edges 212. This can also be referred to herein as inter-sector CoMP. This can allow the eNB 210 of the cell 200) to provide uninterrupted service to multiple UEs 220, even at the sector edges 212.

CoMP may have a plurality of transmission modes, e.g., Joint Processing (JP) mode, dynamic point selection (DPS), joint reception, Coordinated Scheduling/Beamforming (CS/CB) mode, etc. In JP mode, the downlink data for a mobile device (e.g., the UE 120) may be transmitted from several locations simultaneously (Joint Transmission). A simpler alternative is DPS, in which data is available at several locations (e.g. eNB 210), but the data is generally sent from one location at any one time. In CS/CB mode, the downlink data from the eNB 210 to the UE 120 for a mobile device is typically available and transmitted from one point (e.g. eNB 210). The scheduling and optional beamforming decisions are generally made among all cells (e.g., the cells 102) in the CoMP set. Locations from which the transmission is performed can be changed semi-statically.

CoMP may generally have four different deployment scenarios. Using the system 100 of FIG. 1 as an example, the first deployment scenarios can be: homogeneous network intra-eNB CoMP (Scenario 1); homogeneous inter-eNB CoMP (Scenario 2); heterogeneous network in which eNBs are configured with different PCIs (Scenario 3); and heterogeneous network in which eNBs are configured with the same PCI (Scenario 4). Scenario 1 and Scenario 2 are both for homogeneous networks, and differ in whether optical fiber is deployed between physical nodes for backchannel communications. In Scenario 2, the optical fiber permits an eNB to operate remote radio units (RRU) for CoMP over a larger area. Scenario 3 and Scenario 4 are both for heterogeneous networks but also differ in that, in Scenario 4, low power transmitters in the area of a macro cell are allowed to share a same physical cell identity as the macro cell.

Figure 4:
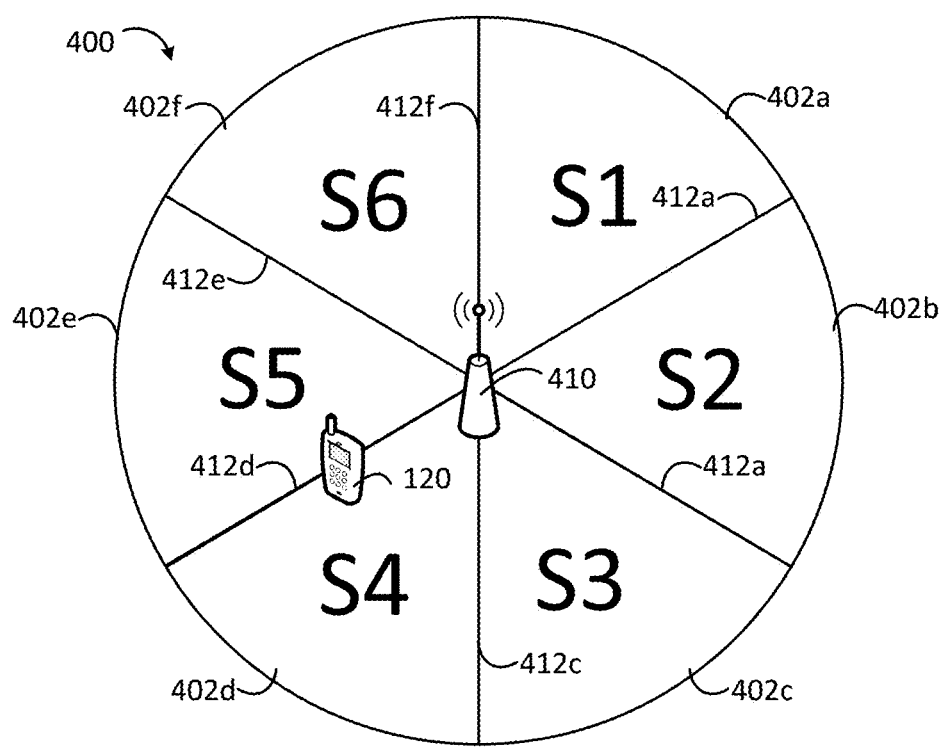
FIG. 4 is a graphical representation of an embodiment of the cell of FIG. 2 using dual beam antennas.

FIG. 4 is a graphical representation of an embodiment the cell of FIG. 2 using dual beam antennas. A cell 400 can be served by an eNB 410. The cell 400 can be divided into six sectors 402. The sectors 402 are labeled as 402a, 402b, 402c, 402d, 402e, 402f.

In some embodiments, the eNB 410 can be similar to the eNB 210, where the individual single beam directional antennas of the eNB 210 are replaced with dual-beam directional antennae resulting in the six sectors 402. In some embodiments, this six sector arrangement can be accomplished by implementing dual beam antennas in each of the three sectors 202 of FIG. 2. Each existing single beam antenna can be replaced, one-for-one with a new dual beam antenna. The sector 202a S1 of the cell 200 can be split using a dual beam antenna to arrive at sectors S5 and S6 of the cell 400. Similarly, the sector S2 of the cell 200 split into sectors S1 and S2 of the cell 400, and the sector S3 of the cell 200 can be split into the sectors S3 and S4 of the cell 400, each using dual beam antennas. Accordingly, the cell 400 can preserve a cell arrangement using three antennas of the cell 200, with two beams per antenna and one sector per beam (e.g., the cell 400).

This arrangement can provide six individual beams corresponding to the six sectors 402. Each beam can then have approximately 60 degrees of coverage per each of the sectors 402. For ease of description, the cell 400 is represented as a circle instead of the three hexagonal sectors as in FIG. 2. The same is true for the following figures.

In some embodiments, each of the sectors 402 (S1, S2, S3, S4, S5, and S6) of the eNB 410 can use the same frequencies and bandwidth. This results in a frequency reuse of n=1. Similar to above, each of the sectors S1-S6 can have a capacity of approximately 60 megabits per second (Mbps) bitrate with a 27 gigabyte (GB) tonnage delivering capacity per hour. Since the cell 400 has six sectors, the entire cell 400 can support 6×60 Mbps and a site tonnage of 162 GB.

In some embodiments, such an arrangement can implement CoMP between adjacent sectors (e.g., the sectors S1-S6) using dual- or multi-beam antennas to achieve large capacity increases. In some embodiments, use of multi-beam antenna can increase capacity by 100%-500%. Dual beam antennae can be used as a primary example herein but different configurations such as three, four, five, or six (or more) beam antennas are also contemplated.

Some embodiments can deploy poly beam antennas and initially connect them to the same RRU sector. As capacity needs dictate, additional remote radio units (RRU) and base band units (BBU) can be added to increase capacity.

Some embodiments can deploy poly beam antennas and connect the beams using frequency reuse of two (n=2). In this arrangement, each antenna beam is connected to an alternate frequency channel in order to eliminate interference to adjacent beams.

In some other embodiments, the use of CoMP can be adapted for use in multi-sector systems. Instead of using CoMP solely for inter-site cell assignment (e.g., from one cell 102a to the next cell 102b, 102c), intra-site CoMP (or inter-sector CoMP) can be implemented to handle situations where the UEs 120 are near a sector edge (e.g., the sector edges 412) within the cell 400. These UEs 120 near the sector edges 412 can also be referred to as sector edge UEs. In a similar manner, the UEs 120 near the edge of the cell 400 can be referred to as cell edge UEs. The cell edge UEs can also be sector edge UEs being located at, for example, a maximum range from the eNB 410 serving the cell 400 and near an adjacent cell 400.

The cell 200 (e.g., a base station or eNB 210) of FIG. 2 with the three sector configuration shown has three sector edges 212 dividing the sectors S1, S2, and S3. The UEs 120 located at the center of the sectors 202 may enjoy strong signal and low or no interference from adjacent sectors 202. The UEs 120 close to one of the sector edges 212 can experience inter-sector interference due to the use of the same spectrum channels (e.g., n=1) on all three sectors.

When the six sector configuration of the cell 400 is considered, the number of sector edges 412 increases from three to six. As the number of sectors per site is increased past from 3, to six, to 9, 12, 15, etc., the number of sector edges where a UE 120 experiences interference from two adjacent sectors also increases. As the number of sectors is increased, antennas with multiple narrower beams can be implemented as in the cell 400. Narrow beams can have sharper side lobes than wider beams (see, FIG. 5). For example, a three sector antenna configuration with 120 degree-wide beams can have a large area of overlap at the sector edges 212. A properly designed six sector antenna configuration with 60 degree coverage areas (e.g., beams) per sector can have a much smaller area of overlap at the sector edges 412 (see, FIG. 6). This can decrease inter sector interference. Consequently the number of UEs 120 in the overlap area of interference can increase as the number of sectors per cell is increased. Therefore coordination between two adjacent sectors is necessary to reduce or eliminate inter-sector interference. Inter-sector interference can be a predominant form of interference in base stations using frequency re-use factor equal to one (n=1).

Inter-sector coordination methods can be used to reduce interference at the sector edge or the cell edge. Such techniques can rely on received signal strength information (RSSI) at the UE 120. The UE 120 can also gather Reference Signal Receive Quality (RSRQ) and report it to the serving sector (e.g., the eNB 410). Such measurement information can be included in a measurement report to the eNB 410. As the number of sectors is increased from three to six, to 9, to 12, 10, 15, etc., a given UE 120 can experience acceptable RSRQ from multiple sectors (of adjacent eNBs 110, for example). Using RSRQ as a way to distinguish the most appropriate or optimum serving sector may be advantageous. The serving sector in this sense can be one of the sectors 402 (e.g., within the cell 400) that provides services to the UE 120. Similarly, the serving eNB can be, for example, the eNB 410 serving the UE 120 within the cell 400 and/or the sectors 402*d*, 402*e*. Using the RSRQ information, the eNB 410, for example, can calculate and determine which UE 120 should be assigned to which sector 402 in order to provide an optimal signal and service. The UE 120 can also independently determine which sector (e.g., the sectors 402) should be the serving sector. In some embodiments, a GPS location can also be used to supplement the RSRQ measurements, for example. Using the example of FIG. 4, the eNB 410 can determine which of the sector 402*d* and the sector 402*e* should be the serving sector based on measurement reports having signal measurement information or location data.

The eNB 210 (FIG. 2) using three sectors per site, for example, can utilize a unique PCI in each sector 202. Therefore, the Reference Signals (RS) broadcast from the eNB 210 in each sector can cause interference in its neighboring sectors 202. This can particularly be an issue in the sector edge 212 area where the UE 120 can receive sufficiently strong reference signals from two adjacent sectors 202 of the same BS (e.g., the eNB 210).

Cell Reference Signal (CRS) interference has been identified as a predominant cause of performance degradation at the sector edges 212 even when there is relatively low traffic on an interfering neighboring sector 202. As noted above, when dual beam antennas are used to replace single beam antennas in order to increase site capacity (see FIG. 4) in networks with frequency reuse of n=1, the number of sector edges 212 experiencing inter-sector interference also increases. In order to mitigate CRS interference at the sector edges 412, two additional methods can be implemented in combination with dual beam antennas to reduce or eliminate CRS interference.

The first method includes combining dual beam antenna with the use of CRS Muting techniques. CRS Muting can selectively mute, or refrain from transmitting, an RS signal in LTE Resource Blocks (RB's) that are idle. There is a minimum quantity of RS signals that are necessary in order to allow UEs to establish synchronization, but it is not necessary to transmit a RS signal in every single RB particularly when no user information is being transmitted in a given RB. By selectively muting the RS in the majority of idle RBs, CRS interference is diminished and in some cases, eliminated. Furthermore, coordinating the idle RB's of a neighboring sector with user RB's of a serving sector used to serve cell edge users further improves RB utilization of the neighboring sector. This way, only idle RB's which were not being used to transmit user information in the neighboring cell, are used to coordinate with the serving cell RB's used for cell edge UEs. This coordination allows for efficient utilization of RB's in the neighboring cell. User information is information that is not signaling information, such as RS and can include data transferred between the UE and eNB on the uplink and eNB and the UE on the downlink.

In some embodiments, CRS Muting can be combined with downlink CoMP. Such a combination can not only eliminate CRS interference, but also benefit from coordinated transmission of the same user information from two adjacent sectors 412. This can allow the eNB 410 to serve a stronger signal to the UEs (e.g., the UE 120) at the sector edges 412. Using these interference reduction methods, the UEs 120 at the sector edges 412 may receive the highest level of modulation and bit rate, enabling provision of uniformly high bit rates to all of the UEs 120 in the cell 400, independent of their location relative to a cell edges or the sector edges 412.

By creating a six sector configuration from a three sector configuration using dual beam antennas, the cell 400 can increase the total number of RB's available in all six sectors, and thereby increase capacity delivered by the three additional sectors 402 (over the cell 200). This comes at the minor expense of shared RB utilization by some UEs 120 at the sector edges 412 however; this can increase the modulation and thereby spectral efficiency of RBs. Since not all of the sectors 402 are necessarily fully loaded all the time, the shared RB utilization can be scheduled with idle blocks of neighboring sectors 402 and minimize the impact of RB sharing.

The second method can include combining the dual beam antennas with the use of SFN. With SFN, the PCI of all sectors 402 within the cell 400 can share the same code. Therefore all reference signals may be synchronized due to constructive interference experienced by the UE 120 located at, for example, the sector edge 412*d*. By synchronizing the CRS of all of the sectors 402 of eNB 410, for example, CRS interference is eliminated between the sectors 402. Coordination at the eNB 410 can then ensure that the UEs 120 located at the sector edges 412 can be served with reference signals from both neighboring sectors 402 of the cell 400 and rely on RF combining to deliver the strongest reference signal possible with no self-interference to the UEs 120 at the sector edges 412. UEs 120 at the center of one of the sectors 402 may be served by a single serving cell (e.g., the eNB 410), since antenna separation ensures little to no interference for the UEs 120 located at the center of the sector 402.

In some embodiments, SFN can be combined with downlink CoMP. Such a combination can not only eliminate CRS interference, but also benefit from coordinated transmission of the same user information from two adjacent sectors 412. This can allow the eNB 410 to serve a stronger user signal to the UEs (e.g., the UE 120) at the sector edges 412. Using these interference reduction methods, the UEs 120 at the sector edges 412 may receive the highest level of modulation and bit rate, enabling provision of uniformly high bit rates to all of the UEs 120 in the cell 400, independent of their location relative to a cell edges or the sector edges 412.

This method shares RB resources for UEs 120 that are at the sector edges 412. However because the dual beam antenna configuration doubles the total amount of RB's at a cell site (e.g., the cell 400), the tradeoff between sharing a small portion of RBs and delivery of higher throughput to UEs 120 at the sector edges 412 is well justified.

In another embodiment, frequency reuse factors can also be adjusted to mitigate inter-sector interference. For example, the cell 400 having the six sectors 402 can use a frequency reuse of, for example, n=2. In the cell 200, n=2 may not be practical given the odd number of sectors 202. That is, as shown in FIG. 3, distribution of only channels A1 and A2 throughout the diagram would results in a difficult situation for interference mitigation without another system such as CoMP. Frequency reuse of n=2 in an even-numbered sector cell (e.g., the cell 400) may eliminate inter sector interference by itself, without the need for another interference mitigation technique, such as CoMP.

In the cell 400 having an even number of sectors 402, frequency reuse n=2 is possible by alternating two different channels (e.g., A1 and A2) in adjacent sectors 402. This virtually eliminates the need for inter-sector or inter-cell interference mitigation as the adjacent channels are different. Such an arrangement can maximize the throughput of each sector, thereby increasing cell site throughput while allowing all UEs 120 to receive higher modulation and bitrate.

Frequency reuse of n=2 can further be done by splitting existing frequency bands, for example, in half. For example, if a 20 MHz band is assigned for a given cell, 10 MHz can be used for alternating sectors to minimize inter sector interference in the six sector cell 400.

Figure 5:
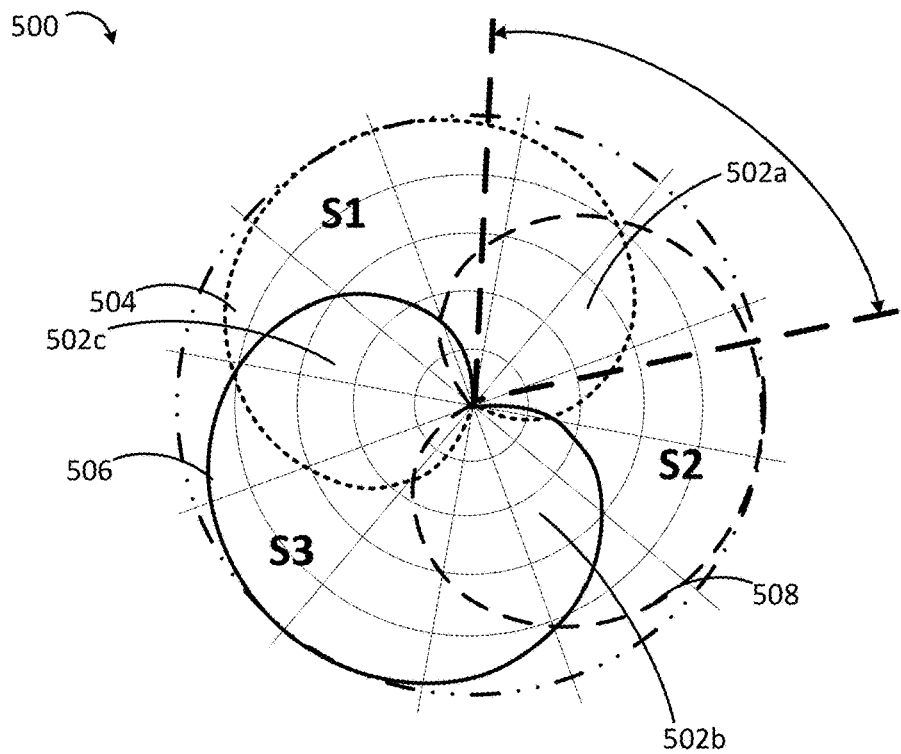
FIG. 5 is a plot diagram of antenna coverage in the embodiment of FIG. 2.

FIG. 5 is a plot diagram of antenna coverage in the embodiment of FIG. 2. A plot 500 depicts the three sectors (e.g., the sectors S1, S2, and S3) of the cell 200, for example. The individual antenna coverages are shown overlapped to provide antenna coverage to 360 degrees of the cell 300. In the plot 500, each of three beams 504 (dotted line), 506 (solid line), 508 (dashed line) has a respective overlap 502 with an adjacent beam. The overlaps are labeled 502a, 502b, 502c. For example, the beam 504 has the overlap 502a of approximately 60 degrees with the beam 506. The amount of the overlap 502a is shown by two bold dashed lines. The beams 506 and 508 have similar overlaps 502b, 502c. The dashed lines represent an approximation of the overlap 502a and may be larger or smaller than 60 degrees as shown.

The overlaps 502 present some cellular coordination issues where interference between adjacent sectors is concerned. When the UE 120 (FIG. 1) is located in one of the overlaps 502, the eNB (e.g., the eNB 410) associated with the beams 504, 506, 508 can use some kind of interference mitigation in order to reduce interference and improve the quality of the signal presented to the UE 120. A larger overlap 502 can result in a requirement for additional coordination between the overlapping sectors. The additional coordination can also result in increased in shared RB utilization and overhead that can lower overall system throughput.

Figure 6:
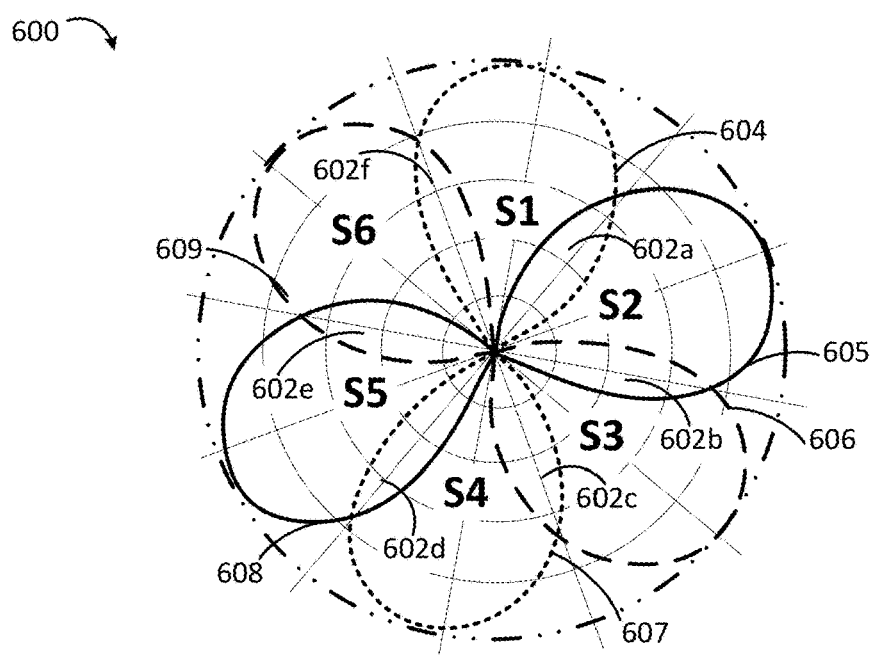
FIG. 6 is a plot diagram of antenna coverage in the embodiment of FIG. 4.

FIG. 6 is a plot diagram of antenna coverage in the embodiment of FIG. 4. A plot 600 is similar to the plot 500 with the six sectors (e.g., the sectors S1, S2, S3, S4, S5, and S6 of the cell 400) overlapped to provide antenna coverage to 360 degrees of the cell 400. The cell 400 uses a similar three sector division as the three sector cell 200, however the cell 400 can implement dual beam antennas in each of three sectors (e.g., the sectors 202). Each of the dual beam antennas can provide services to a 60 degree sector of the cell (e.g., the cell 400), providing a total of six sectors S1-S6 as shown corresponding to a respective beam 604, 605, 606, 607, 608, 609.

The plot 600 shows overlaps 602. The overlaps 602 lie between each of the adjacent beams 604-609. However, when compared to the overlaps 502 of FIG. 5, the overlaps 602 are significantly smaller. This can be a result of the narrower beam patterns of the dual-beam directional antennas. As shown in the plot 600, the overlaps 602 are less than approximately 15 degrees each, at their widest points. Accordingly, the beams 604-609 may be tighter, narrower, and/or more focused than the beams 504, 506, 508 of the single beam directional antennas of FIG. 5. As a result, there is a smaller overlapped areas between the sectors 402 (FIG. 4) and thus a smaller area in which the serving cell may need to conduct interference mitigation between each of the adjacent overlapping areas of the six sectors.

Figure 7:
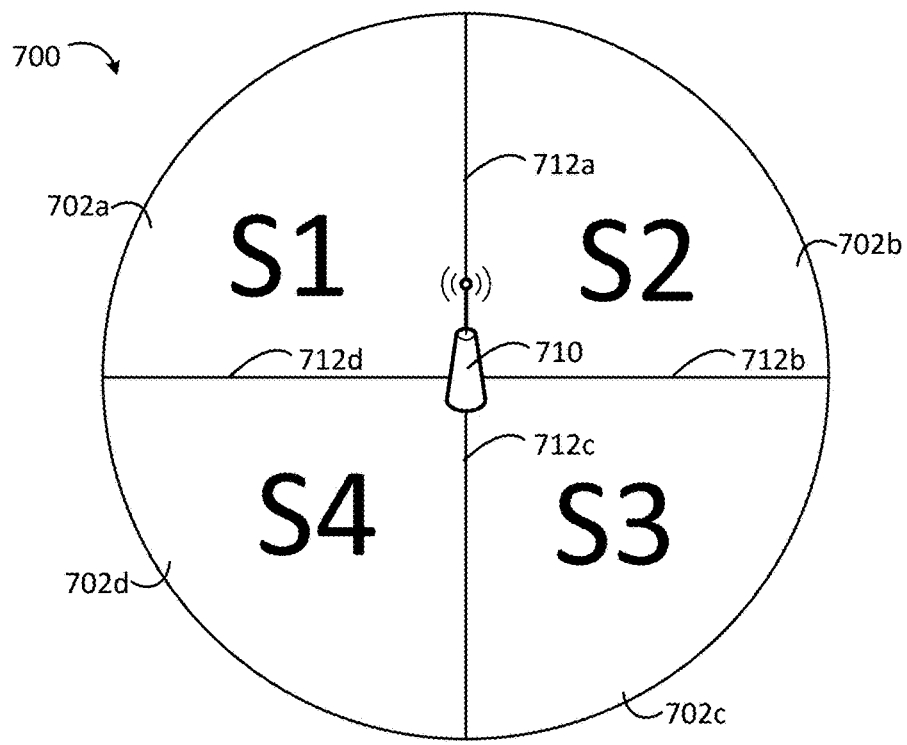
FIG. 7 is a graphical representation of a four sector cell.

FIG. 7 is a graphical representation of a four sector cell. A four sector cell 700 can have an eNB 710 that serves four sectors 702. The sectors 702 are labeled sectors 702a, 702b, 702c, 702d. Each of the sectors 702 can have a sector edge 712, similar to the sector edges 212 and the sector edges 412 of previous embodiments. The arrangement of the four sector cell 700 can be similar in layout and employment as the three sector cell 200.

Similar to the cell 200 and the cell 400, the cell 700 also may also conduct some kind of interference mitigation at the sector edges 712 and cell edges, for example. In one embodiment, the cell 700 can change a frequency reuse factor. Using frequency reuse of n=1 can require that the eNB 710 conduct CoMP, RCS muting, SFN or some other reactive interference mitigation, as the sectors 702 are all using the same frequency band, A1, for example. Given that there are an even number of sectors 702, a frequency reuse of n=2 can also be used. For example, if A1 and A2 are the frequency bands in use, then the two bands can be alternated. A1 can be in the sector 702a and 702c, while Band A2 can be used in the sector 702b and the sector 702d. Thus, at the cell edges 712, no further interference mitigation is required. In the embodiment using n>1 where adjacent sectors 702 are not utilizing the same channels, additional interference mitigation using CoMP, CRS muting, and SFN may not be required.

Figure 8:
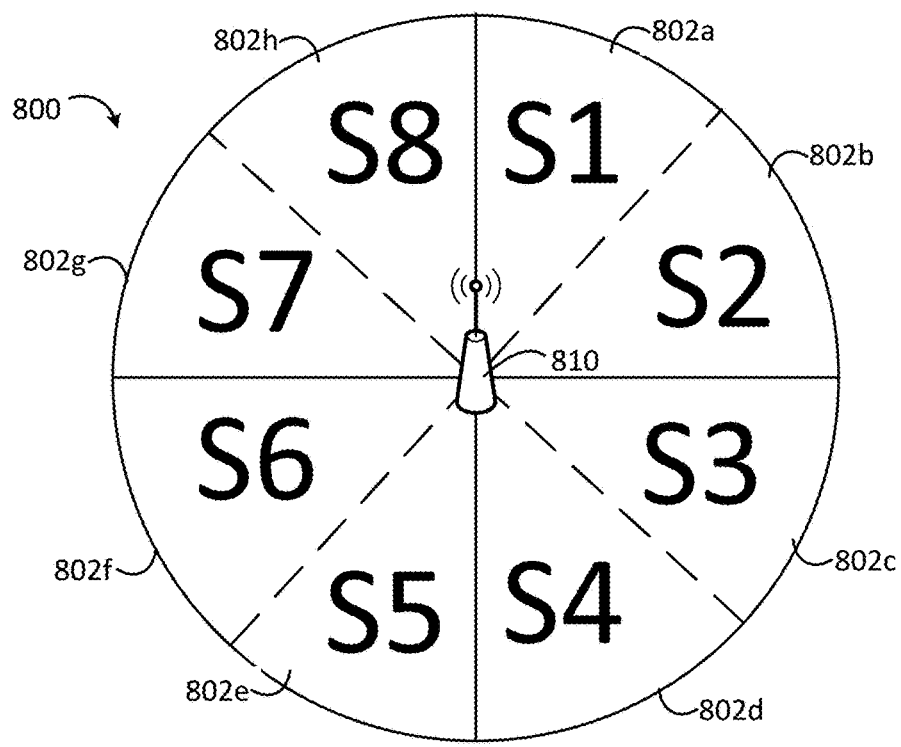
FIG. 8 is a graphical representation of an embodiment of the cell of FIG. 7 using dual beam directional antennas.

FIG. 8 is a graphical representation of an embodiment of the cell of FIG. 7 using dual beam directional antennas. A base station, 810, can serve a cell 800. The cell 800 can be, for example, the cell 700 with the single beam directional antennas, replaced with dual beam directional antennas. The cell 800 can thus have eight sectors 802, labeled 802a, 802b, 802c, 802d, 802e, 802f, 802g, 802h. Similarly, the sectors 802 have corresponding sector edges 812a-812h. The cell 800 can therefore be similar to the cell 400 incorporating a dual beam directional antenna in place of a single beam antenna in a four sector arrangement. The dashed lines of a portion of the sector edges 812 represent a subdivision of the four sector arrangement of the cell 700 to eight sectors 802. As a result, the cell 800 has an even number of sectors 802, thus the frequency reuse factor of n=2 is possible.

Replacing single beam antennas with dual beam antennas to create the eight sector arrangement (the sectors 802) from the four sectors 702 results in twice as many sector edges and twice as much interference. Frequency reuse of n=2 can eliminate the inter sector interference in the sectors 802.

The cell 800 can differ from the cell 400 in the angular coverage of each individual sector 802. For example, the sector 402a (FIG. 4) can have a 30 degree coverage, while the sector 802a has a 45 degree coverage.

Figure 9:
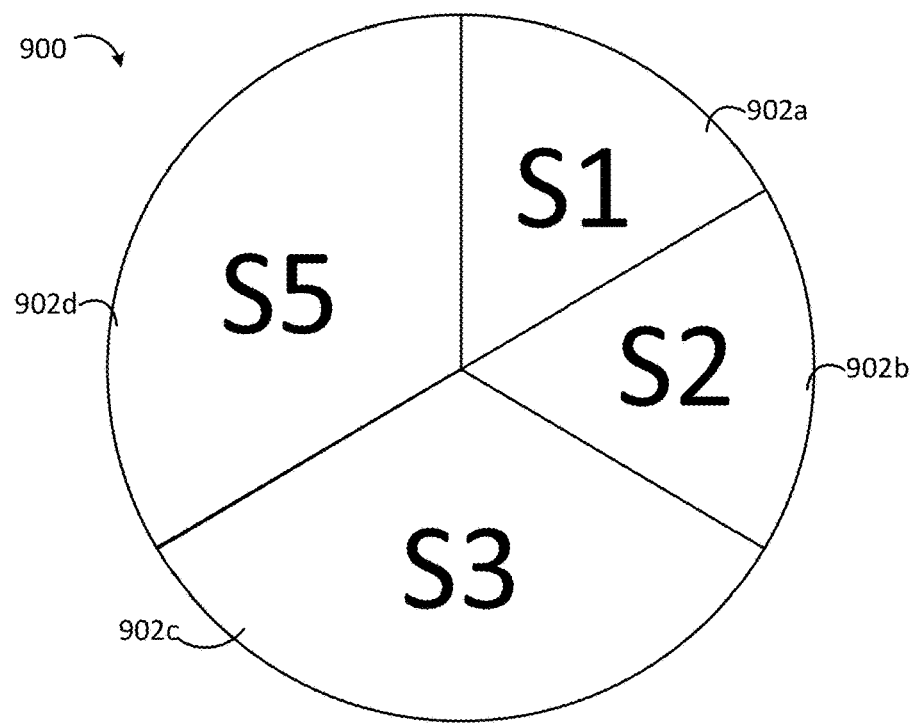
FIG. 9 is a graphical representation of a coverage area of another embodiment of the cell of FIG. 2.

FIG. 9 is a graphical representation of a coverage area of another embodiment of the cell of FIG. 2. A cell 900 can have four sectors S1, S2, S3, S4, similar to the cell 700, but with different angular coverages. For example, the cell 900 can be the cell 200 with only one sector modified to form the sectors 902a, 902b using the dual beam antenna. This can be done, for example, in response to usage rates of the eNB 210 or congestion in the sector 202a. The sector 202b of FIG. 2 can be replaced with a dual beam antenna to form sectors 902a and 902b. This can subdivide the sector 202b, providing two approximately 60 degree sectors 902a, 902b (S1, S2 of FIG. 9) and two 120 degree sectors 902c, 902d (S3, S4 of FIG. 9). This can also be referred to as an improved antenna array.

In some embodiments this can provide a number of advantages. As noted previously, any time the number of sectors in a cell increases with the implementation of a dual beam directional antenna to replace, for example, a single beam antenna, the number of sector edges (e.g., the sector edges 412, 812) increases. In the n=1 configuration of the cell 200, for example, this may necessitate the use of CoMP, CRS muting or SFN for interference mitigation. However, with the formation of the sector 902a and the sector 902b, four sectors 902 are formed, allowing the use of frequency reuse factor n=2. Thus, two channels (e.g., A1, A2) can be used in an alternating manner, assigning for example, A1 to S1 and S3 and A2 to S2 and S4 of the cell 900.

Figure 10:
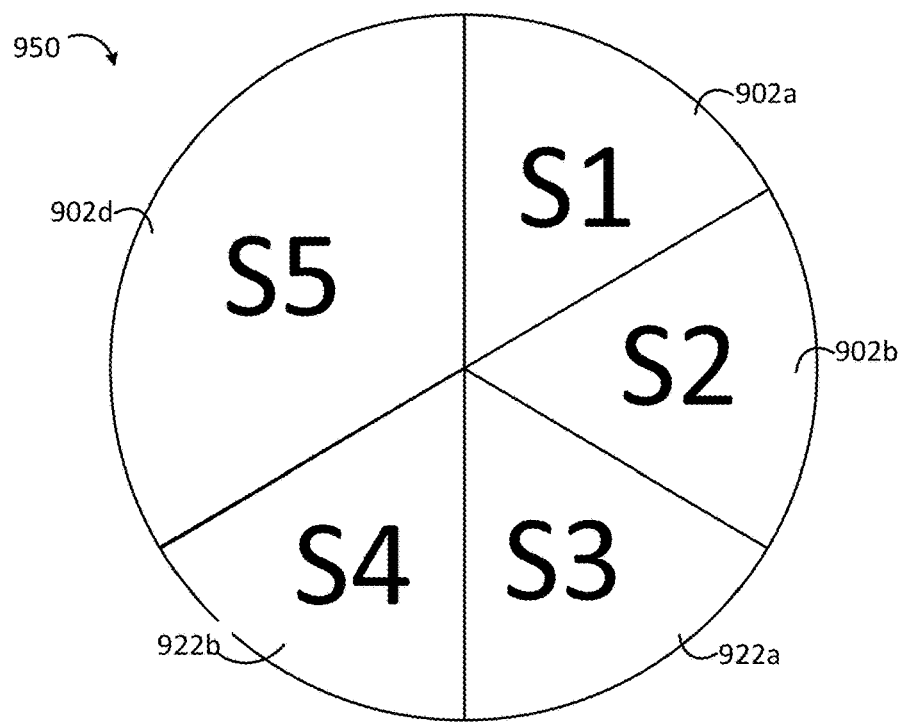
FIG. 10 is a graphical representation of a coverage area of another embodiment of the cell of FIG. 9.

FIG. 10 is a graphical representation of a coverage area of another embodiment of the cell of FIG. 9. A similar approach can be taken with the sector 902c as was taken with the sector 202b above. The single beam directional antenna serving the sector 902c can be replaced with a dual beam antenna to form sectors 922a, 922b. The cell 900 can be thus be modified into a cell 950 subdividing the sector 902c providing four approximately 60 degree sectors (S1, S2, S3, S4) and one 120 sector (S5). Accordingly, virtually any number of subdivisions can be implemented. In the examples of FIG. 9 and FIG. 10, it can be seen that different antenna sector configurations can be useful for different applications, such as when there is an irregular distribution of UEs 120 in a given sector 202.

Figure 11:
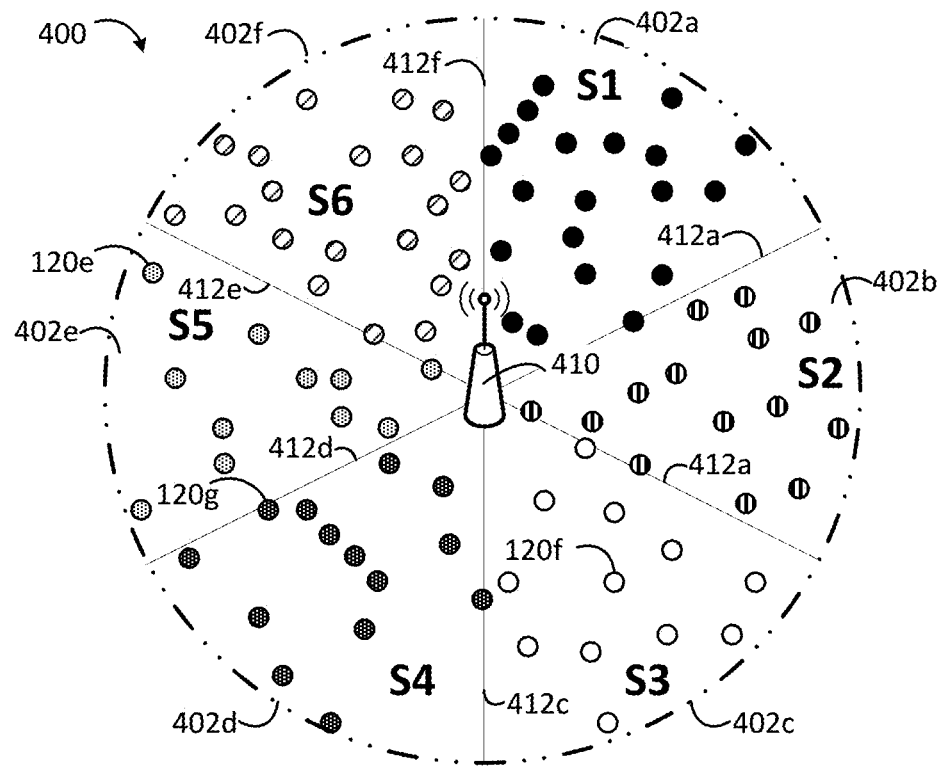
FIG. 11 is a graphical depiction of another embodiment of the cell of FIG. 4.

FIG. 11 is a graphical depiction of another embodiment of the cell of FIG. 4. The cell 400 is shown with the eNB 410. A plurality of UEs 120 are distributed among the six sectors of the cell 400. For ease of description, not all of the UEs 120 are labeled.

As described in connection with the foregoing figures, increased sector numbers increases the presence of intersector interference, particularly at the sector edges 412. The eNB 410 can implement certain kinds of interference mitigation methods in order to reduce or eliminate such interference.

In intra site CoMP, the eNB 410 can assign individual UEs 120 to a given sector among the six available sectors. In some embodiments, the eNB 410 can transmit a reference signal in each sector 402 such as the PCI or RS described above. The UEs 120 can receive the reference signals and report to the eNB 410 a receive signal strength indication (RSSI) or received signal to noise ratio (RSNR). The RSSI or the RSNR can be a factor that the eNB 410 analyzes in order to assign the UEs 120 to respective sectors 402 within the cell 400.

In some embodiments, the eNB 410 can further use geographic position to supplement the intra site CoMP and coordinate sector assignment to each of the UEs 120. In some examples, the eNB 110 is stationary, so it can have a fixed geographic position. Similarly, each of the dual band antennas used by the eNB 410 can have a fixed coverage area. Therefore if the eNB 410 knows the approximate position of an individual UE 120, the eNB 410 can assign the UE 120 to a particular sector.

In an embodiment, the eNB 410 can triangulate a position of a UE 120f. In such an embodiment, the reports of RSSI or RSNR received at one or more antennas of the eNB 410 can be used to approximate the position of the UE 120f. In another embodiment, the UE 120f can triangulate its own position using a received signal from the eNB 410 (e.g., the pilot signal of the sector 402c) or another eNB from an adjacent cell. In another embodiment, the UE 120f can also report a global positioning system (GPS) position. Such position information can improve UE sector assignment in intra site CoMP or inter sector CoMP.

In another embodiment, the UE 120g may be on the sector edge 412d between the sector 402d S4 and the sector 402e S5, as shown. In such an embodiment, the eNB 410 can receive an indication of signal strength from the UE 120g from the antenna beams serving S4 and S5. In the event that the RSSIs are ostensibly equal, the eNB 410 can coordinate sector assignment based on, for example, direction of motion of the UE 120g, or a geographic position of the UE 120g. The eNB 410 can also, for example, assign the UE 120g to the sector with higher available capacity or lowest population all other aspects being equal.

In some embodiments, the UEs 120 can be stationary or slow moving. This can decrease or minimize the amount of CoMP processing required for stationary or slow moving UEs 120. Conversely, for fast moving UEs 120, more CoMP processing may be required, particularly when additional sectors (e.g., six sectors or more) are present.

When the eNB 210 (e.g., a base station) is serving fixed wireless users (the UEs 120), all of the UEs 120 are stationary, except when they are commissioned or decommissioned or when they are moved to be installed in other locations. Once installed, fixed customer premises equipment (CPE) may be stationary by nature. Therefore, using known or fixed GPS coordinates of a fixed UE 120 may be a practical way of assigning fixed UEs 120 to their serving eNodeB 110 sectors. Such fixed or stationary CPE can also conduct measurement of RSRQ, or RSSI, for example to determine the best serving sector 402.

Figure 13:
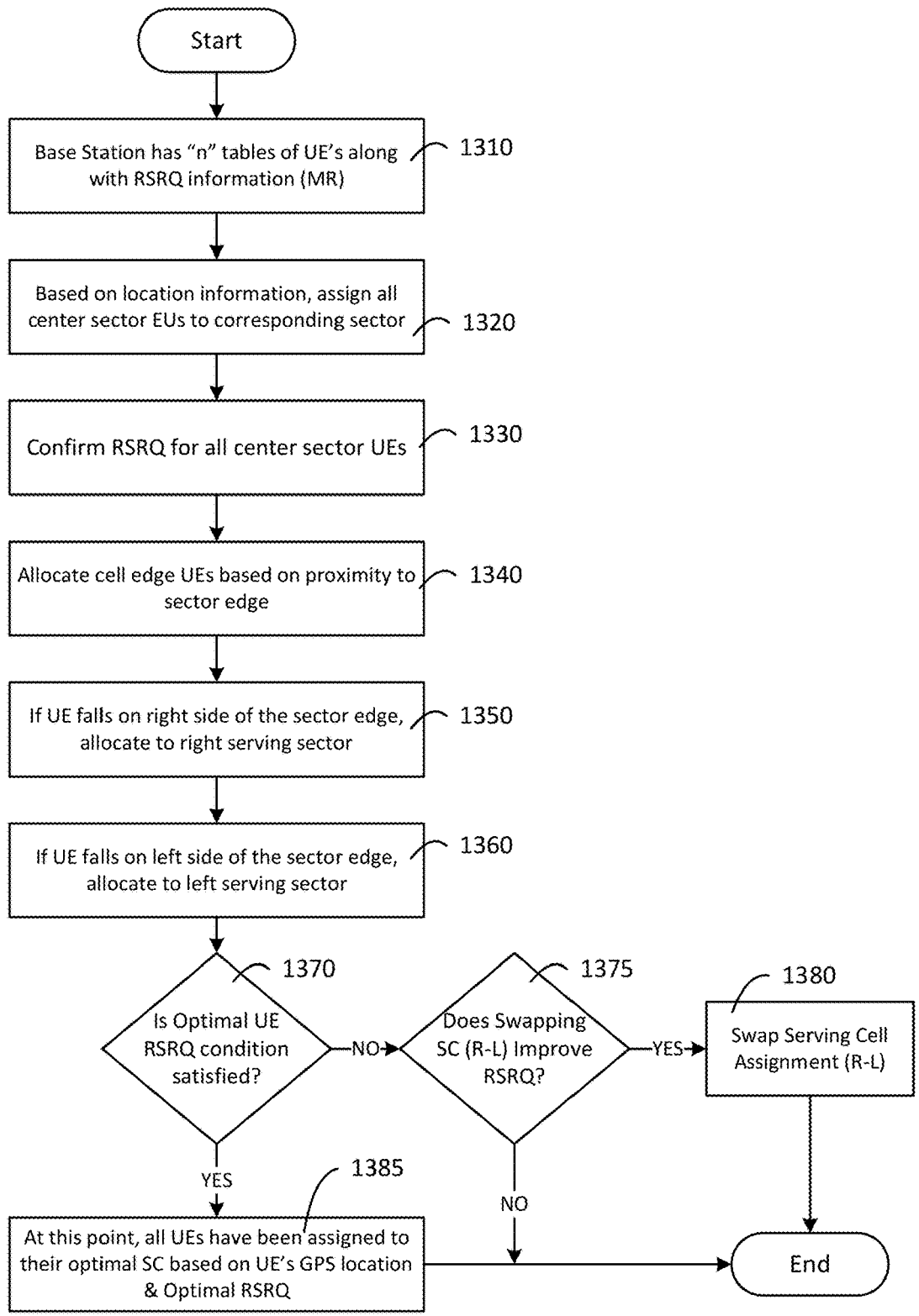
FIG. 13 is a flowchart of an embodiment of a method for assigning a UE to a serving sector of an eNB.

When the eNB 410 is serving semi-fixed users, such as nomadic UEs 120 that move infrequently, (such as a few times a day), then the GPS locations can be updated frequently enough so that the optimal sector can be determined based on the sector assignment (FIG. 13). In a semi-static environment, the eNB 410 can gather GPS information by requesting it from the UEs 120 to report a change in their GPS coordinates compared to the last one reported. In some embodiments, the GPS coordinates can be requested to make sure the UEs 120 have not moved or to accommodate UEs 120 that have moved.

Some mobile networks can support slow moving UEs 120 (e.g., less than a meter per second). For example, a stadium full of thousands of people carrying mobile devices looks like a semi-static environment from the point of view of how quickly users move.

In a fully mobile network where the UEs 120 are on high speed transportation vehicles, such as cars, buses, and trains, the dynamic method of updating signal measurements or GPS locations may be needed. These networks must also support handovers whereby the serving base station hands over a moving UE 120 to the next serving cell or serving sector. It is possible to use information from the existing means of handover, along with GPS locations to determine which sector edge a given UE is approaching and crossing and for that duration, use CoMP techniques to enhance the signal strength delivered to this UE.

In another embodiment, the eNB 410 can further use frequency reuse factor n=2, for example. This can virtually eliminate the need for interference mitigation techniques, such as CoMP at the sector edges 412, as the frequency reuse n=2 provides for different channel, A1, A2 for instance, in adjacent sectors 402.

Figure 12:
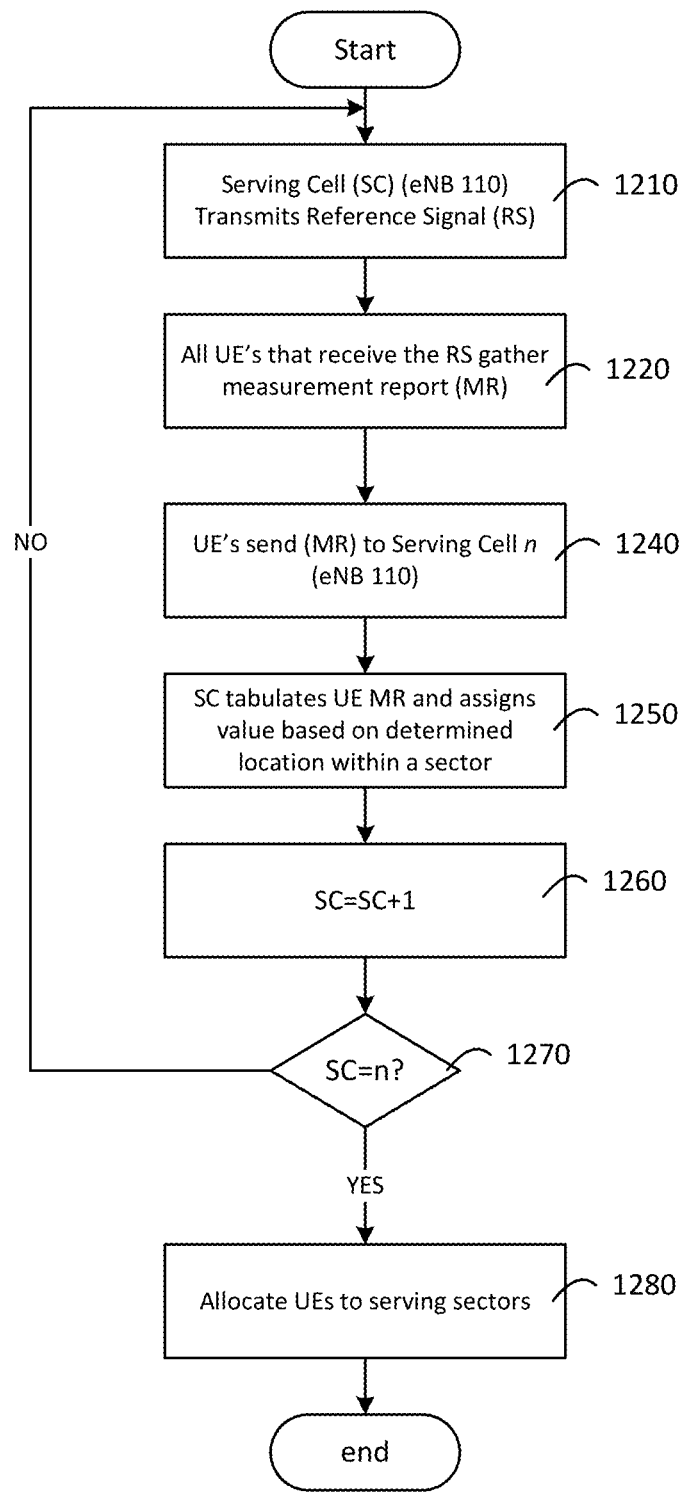
FIG. 12 is a flowchart of an embodiment of a method for intra site coordinated multi point communications.

FIG. 12 is a flowchart of an embodiment of a method for intra site coordinated multi point communications. A method 1200 is an embodiment of "Enhanced CoMP" allowing the gathering of measurement reports (MR) from each UE 120 in order to allow assignment of UEs 120 to a given sector. The method 1200 can allow the eNB 410 to assign UEs 120 in the cell (e.g., the cell 400, 800, 900) to a given sector (e.g., the sectors S1-S6 of FIG. 4, FIG. 11) based on the MR from each individual UE 120. The method 1200 is described below in connection with a three sector eNB such as the eNB 210; however any number of sectors can be implemented. Similar descriptions are also used below in connection with FIG. 13. the eNB 410 (e.g., a base station, or the eNB 410)

can have n-tables, where n is the number of sectors served by the cell (e.g., the cell 400). The method 1200 is described in connection with the cell 400 (FIG. 4), however the method 1200 is applicable to any of the cells described herein The method 1200 can allow an eNB 410 to scan the UEs 120, for example, one or more sector at a time to gather the measurement report (MR) from the UEs 120. The measurement report can include the RSRQ information. The measurement report can also include position information (e.g., GPS coordinates) of each of the UEs 120. Information can be gathered from each sector until all sectors have gathered their table of UEs 120 along with their corresponding GPS locations and RSRQ information.

At block 1210, a serving cell (e.g., the eNB 410) of a given sector (e.g., the sector 202a) can send a reference signal (RS) to the antenna beam associated with, for example, sector S1.

At block 1220, all of the other sectors of the serving cell (eNB 410) can be muted, and all UEs 120 in the sector, at the sector edges (e.g., the sector edges 412) or within range of the eNB 410 can listen and receive a reference signal from the antenna serving sector S1. Based on the location of the UE 120 relative to the coverage area of the sector S1 antenna beam, each UE 120 that receives the RS can generate a measurement report (MR). The measurement report can include RSRQ information. The MR can further include a GPS position of the UE 120. The GPS position or coordinates can be known through one of many ways, such as having a GPS receiver in the UE 120 or through radio frequency triangulation of the PCI or RS, for example. The process of block 1220 can occur simultaneously with the process of block 1210.

The eNB 410 can request reports from each of the UEs 120 present in the coverage area. At block 1240, each UE 120 can transmit a respective MR to the serving eNB (e.g., the eNB 210, 410). The UEs 120 can send their respective MR's to the serving cell sequentially.

At block 1250, the serving cell (e.g., the eNB 210, 410) can compile the MRs recording and record a position of each reporting UE 120. The position can be determined based on triangulation of a RS. The position can be determined based on the GPS position of the UE 120. At block 1250, the serving cell can then calculate a relative location of each UE 120 to its antenna beam (for, e.g., sector S1). Since the serving cell knows its own GPS location and the radiating pattern of each of its antenna beams, the serving cell can classify each UE 120 as being located at the center of its beam, a right edge of its beam, or a left edge of its beam. This tabulation of UEs 120 based on relative location under the coverage area of an antenna beam (of, e.g., the sector S1), together with the RSRQ information can allow assignment of a value or score to each UE 120 relative to a specific beam (e.g., the beams for sectors S1, S2, S3 of the eNB 210), and thereby to a specific eNB (e.g., the eNB 410). The UEs 120 in the center of an antenna beam with a strong RSRQ can be assigned a high score.

At block 1260, the eNB 410 can increment a sector count (SC) (e.g., sector S1 to sector S2) and then conduct the same process described above for the next serving cell (or sector), for example, the sector S2, S3, Sn, . . . for the eNB 410.

At decision block 1270, the eNB (e.g., the eNB 210, 410) can determine if all serving cells or sectors have completed tabulation. The method 1200 can be repeated and completed for each eNB 410 until all sectors are scanned and all UEs 120 have an assigned score.

At block 1280, the eNB can determine that all serving cells/serving sectors have gathered measurement reports from all UEs 120 and have calculated their relative scores relative to each UE 120. At block 1280, the eNB can assign each UE 120 in the cell to a serving sector.

FIG. 13 is a flowchart of another embodiment of a method for assigning a UE to a serving sector of an eNB. A method 1300 can assign the UEs 120 to a sector (e.g., sectors S1, S2, S3 of eNB 210) based on the MR tables and scores gathered in the method 1200. In some embodiments, the method 1200 focuses on gathering MRs from the UEs 120, one serving cell or sector at a time, and scoring the results relative to each serving cell or sector. The method 1300 can go a step further and process the data collected by the eNB 410 to allocate the UEs 120 to an optimal serving cell or sector within the coverage area, minimizing inter-sector interference.

At block 1310, the eNB 410 (e.g., a base station, or the controller 130) can have n-tables, where n is the number of sectors served by the cell (e.g., the cell 400). The method 1300 is described in connection with the cell 400 (FIG. 4), however the method 1300 is applicable to any of the cells described herein.

At block 1320, the eNB 410 can determine which UEs 120 fall in the center of a given sector 402 based on location information. The location information can be, for example, signal strength information measured by the UE 120. The information can also include a GPS position, similar to above. The UEs 120 at the center of the sector 402 can be assigned to that sector. For example, if the only RS received at the UE 120f (FIG. 11) is for the sector 402c or a GPS position indicates the same, the UE 120f can be assigned to the sector 402c.

At block 1330, the eNB 410 can also confirm that the RSRQ from that sector received at the UE 120f, is optimal or at least within a predetermined or acceptable range.

At block 1340, the eNB 410 can allocate UEs 120 to the sectors 402 or serving cells based on proximity to a cell edge line, or the sector edges 412.

At block 1350, the eNB 410 can allocate the UE 120 to the right serving cell or sector.

At block 1360, the eNB 410 can allocate the UE 120 to the left serving cell.

At decision block 1370, the eNB 410 can compare the serving sector score of a sector edge UE 120 with the score of the same UE 120 from the adjacent serving sector.

At decision block 1375, the eNB 410 can determine if swapping the serving sector for that UE 120 might improve the RSRQ. If no, then the given iteration of the method 1300 can end.

If yes, at block 1380, the serving sector assignment to the UE 120 can be swapped. The method 1300 can be repeated until all UEs 120 have been assigned to their optimal serving cells.

The eNB 410 can then confirm that the RSRQ for the adjacent sector to the left and right of the assigned sector are lower than a prescribed threshold. If the signal from adjacent sectors is weak, then the interference from the adjacent sector signals will also be weak. Therefore, the eNB 410 can transmit to a UE 120 in the center of a sector 402 without coordination with the R or L sectors.

For the UEs 120 that fall on or close to a sector edge 412, the UE 120 can report acceptable RSRQ from both the right and left sectors. The eNB 410 can use measurement reports or location information (e.g., GPS coordinates) of the UE 120 on the sector edge 412 and pick the sector 402 that should have lower interference. If the RSRQ of this sector 402 is optimal, then this sector will be assigned to the UE 120. This process can continue until all UEs 120 have been assigned to their optimal serving sectors 402.

The eNB 410 can generate a table of UEs 120 in each sector. The table can have UEs 120 identified in one of three ways: 1) Center UEs 120 that do not need coordination; 2) UEs 120 that are close to the Right Sector Edge: these UEs 120 may need coordination with the Right Sector; and 3) UEs 120 that are close to the Left Sector Edge: these UEs 120 will need coordination with the Left Sector.

In a six sector environment of the cell 400, and based on the sharpness of the antenna beam lobes (e.g., FIG. 5, FIG. 6), it is anticipated that approximately 80% of the evenly distributed UEs 120 in the cell 400 may end up in the center of a given sector, with 10% of UEs 120 ending up close to the right sector edge, and an additional 10% of UEs 120 being located in the left sector edge. This example is based on a function of the antenna pattern overlap and the statistical distribution of users.

In this example, coordination can take place on approximately 20% of the UEs 120 served by a given sector. This means that 80% of the UEs 120 will not experience notable inter-sector interference. The remaining 20% of the UEs 120 that are located at the edges of a sector may use CoMP techniques such as selective muting and/or coordinated Joint Transmission in order to enhance their signal and eliminate interference.

Figure 14:
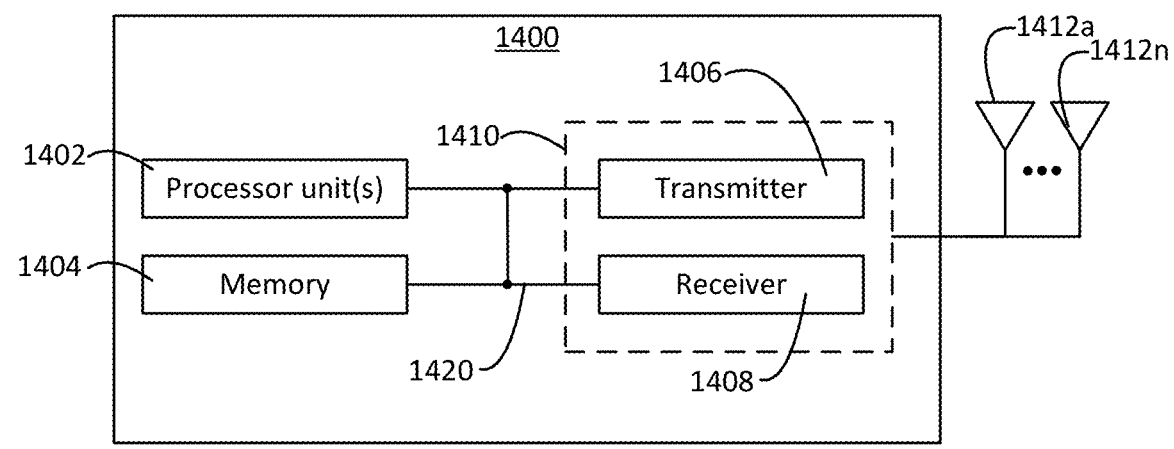
FIG. 14 is a functional block diagram of a device for use in the system of FIG. 1 and the cells of FIG. 4 through FIG. 11 and the methods of FIG. 12 and FIG. 13.

FIG. 14 is a functional block diagram of a device for use in the system of FIG. 1 and the cells of FIG. 4 through FIG. 11 and the methods of FIG. 12 and FIG. 13. A device 1400 can be used in connection with the systems and embodiments of the various cells described herein. For example, the device 1400 can be implemented in the system 100 (FIG. 1) to perform functions of the eNB 110 and/or the controller 130. The device 1400 can further be used to perform various functions associated with the cell 200, the cell 400, the cell 700, the cell 800, the cell 900, and the cell 950.

The device 1400 can have a processor 1402. The processor 1402 can be implemented as one or more processors, processor units, or microprocessors. The processor 1402 can also be referred to as a central processing unit (CPU). The processor 1402 can control operation of the device 1400. The processor 1402 can implement the steps of the methods described in the methods of FIG. 12 and FIG. 13 and the functions associated with, for example, the controller 130, the eNB 110, the eNB 210, the eNB 410, the eNB 710, and the eNB 810. The processor 1402 can perform the various steps within the foregoing flowcharts, in connection with the various embodiments of the cells described above, combining, overlapping, repeating, or performing them out of order as needed. For example, as noted above, at least the cell 200 and the cell 400 can be combined with elements of the other cells 700, 800, 900, 950.

The device 1400 can also have a memory 1404 coupled to the processor 1402. The memory 1404 can include both read-only memory (ROM) and random access memory (RAM). The memory 1404 can provide instructions and data to the processor 1402. At least a portion of the memory 1404 can also include non-volatile random access memory (NVRAM). The processor 1402 can perform logical and arithmetic operations based on program instructions stored within the memory 1404. The instructions in the memory 1404 can be executable to implement the methods described herein. In some embodiments, the memory 1404 can perform functions associated with the method 1200 and the method 1200, in addition to the receipt and storage of certain measurement reports received from the UEs 120.

The processor 1402 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 1402 and the memory 1404 can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The device 1400 can also include a transmitter 1406 and/or a receiver 1408 to allow transmission and reception of data between the device 1400 and a remote location via, for example, a network or direction connection associated with the UEs 120 and any one of the cells, eNB, or base stations, etc., described above. The transmitter 1406 and the receiver 1408 can be combined into a transceiver 1410. The device 1400 can also have one or more antennas 1412a through 1412n electrically coupled to the transceiver 1410. The antennas 1412a-1412n can represent the various antennas in an omnidirectional or directional configuration, in a single-beam, dual-beam, or multi-beam arrangement as disclosed herein. Each antenna 1412a-1412n can be associated with a one or more beams and the various configurations of the sectors described above. In some embodiments, each beam of the multi-beam antennas can have its own transceiver 1410. The device 1400 can also include (not shown) multiple transmitters, multiple receivers, multiple transceivers, and/or multiple antennas as needed for various communication standards.

The transmitter 1406 can be configured to wirelessly transmit packets having different packet types or functions. For example, the transmitter 1406 can be configured to transmit packets of different types generated by the processor 1402.

The receiver 1408 can be configured to wirelessly receive packets having different packet types. In some examples, the receiver 1408 can be configured to detect a type of a packet used and to process the packet accordingly.

In some embodiments, the transmitter 1406 and the receiver 1408 can be configured to transmit and receive information via other wired or wireline systems or means.

The various components of the device 1400 can be coupled together by a bus system 1420. The bus system 1420 can include a data bus, for example, as well as a power bus, a control signal bus, and a status signal bus in addition to the data bus. The components of the device 1400 can be coupled together or accept or provide inputs to each other using some other mechanism.

Those of skill will appreciate that the various illustrative blocks described in connection with the embodiments disclosed herein can be implemented in various forms. Some blocks have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a block or step is for ease of description. Specific functions or steps can be moved from one block or distributed across to blocks without departing from the present disclosure.

The various illustrative blocks described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the present disclosure. Various modifications to these embodiments will be readily apparent to those skilled in the art, and the generic principles described herein can be applied to other embodiments without departing from the spirit or scope of the present disclosure. Thus, it is to be understood that the description and drawings presented herein represent a presently preferred embodiment of the present disclosure and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method for reducing inter-sector interference for a base station having one or more multi-beam antennas each, the one or more multi-beam antennas having two or more beams and the base station having a coverage area, the method comprising:
   dividing the coverage area into sectors based on one or more beams associated with each antenna, each beam being associated with a sector, each sector having a sector edge bordering an adjacent sector, the sectors being arranged radially around the base station;
   transmitting a reference signal via each beam to one or more user equipments (UEs) in each sector, each sector having a reference signal including synchronization information;
   receiving, at a transceiver coupled to the multi-beam antenna, one or more measurement reports from the plurality of UEs, the one or more measurement reports indicating receive quality of at least one reference signal;
   determining that at least one UE of the plurality of UEs is a sector edge UE located at a sector edge of one or more of the sectors, based on the one or more measurement reports;
   assigning, based on the determining, the sector edge UE to a sector having a higher receive quality of the at least one reference signal; and
   selectively muting at least one reference signal associated with idle resource blocks (RBs) to reduce interference for one or more sector edge UEs served by adjacent sectors, the one or more sector edge UEs being located at a sector edge.

2. The method of claim 1 further comprising coordinating idle resource blocks (RBs) of a neighboring sector with user RBs of a serving sector used to serve sector edge UEs.

3. The method of claim 1 further comprising categorizing the at least one UE based on the one or more measurement reports as one of a sector-center UE and a sector-edge UE.

4. The method of claim 3, further comprising performing interference mitigation for at least the sector edge UE.

5. The method of claim 1 further comprising dividing the coverage areas into an even number of sectors wherein a frequency reuse factor of two is used in the coverage area.

6. The method of claim 1 further comprising transmitting the reference signal comprising a physical cell identity code that is identical in each sector, wherein reference signal is synchronized in the sectors to appear to be generated at the same location.

7. The method of claim 1, further comprising receiving a location report from each UE of the plurality of UEs, the location report including a location of the UE determined at the UE.

8. The method of claim 1, further comprising receiving more than one measurement report from each UE of the plurality of UEs, the measurement report indicating received quality of a reference signal.

9. A non-transitory computer-readable medium comprising instructions for reducing inter-sector interference for a base station having one or more multi-beam antennas each, the one or more multi-beam antennas having two or more beams and the base station having a coverage area, that when executed by a computer cause the computer to:
   divide the coverage area into sectors based on one or more beams associated with each antenna, each beam being associated with a sector, each sector having a sector edge bordering an adjacent sector, the sectors being arranged radially around the base station;
   transmit a reference signal via each beam to one or more user equipments (UEs) in each sector, each sector having a reference signal including synchronization information;
   receive, at a transceiver coupled to the multi-beam antenna, one or more measurement reports from the plurality of UEs, the one or more measurement reports indicating receive quality of at least one reference signal;
   determine that at least one UE of the plurality of UEs is a sector edge UE located at a sector edge of one or more of the sectors, based on the one or more measurement reports;

assign, based on the determining, the sector edge UE to a sector having a higher receive quality of the at least one reference signal; and selectively mute at least one reference signal to reduce interference for one or more sector edge UEs served by adjacent sectors, the one or more sector edge UEs being located at a sector edge.

10. The non-transitory computer-readable medium of claim 9 further comprising instructions that cause the computer to coordinate idle resource blocks (RBs) of a neighboring sector with user RBs of a serving sector used to serve sector edge UEs.

11. The non-transitory computer-readable medium of claim 9 further comprising instructions that cause the computer to categorize the at least one UE based on the one or more measurement reports as one of a sector-center UE and a sector-edge UE.

12. The non-transitory computer-readable medium of claim 11 further comprising instructions that cause the computer to perform interference mitigation for at least the sector edge UE.

13. The non-transitory computer-readable medium of claim 9 further comprising instructions that cause the computer to divide the coverage areas into an even number of sectors wherein a frequency reuse factor of two is used in the coverage area.

14. The non-transitory computer-readable medium of claim 9 further comprising instructions that cause the computer to transmit the reference signal comprising a physical cell identity code that is identical in each sector, wherein reference signal is synchronized in the sectors to appear to be generated at the same location.

15. The non-transitory computer-readable medium of claim 9 further comprising instructions that cause the computer to receive a location report from each UE of the plurality of UEs, the location report including a location of the UE determined at the UE.

16. The non-transitory computer-readable medium of claim 9 further comprising instructions that cause the computer to receive more than one measurement report from each UE of the plurality of UEs, the measurement report indicating received quality of a reference signal.

17. A system for reducing inter-sector interference for a base station, the system comprising:

a plurality of antennas dividing the coverage area into sectors based on one or more beams associated with each antenna of the plurality of antennas, each beam being associated with a sector, each sector having a sector edge bordering an adjacent sector, the sectors being arranged radially around the base station;

at least one transmitter coupled to the plurality of antennas and configured to transmit a reference signal via each beam to one or more user equipments (UEs) in each sector, each sector having a reference signal including synchronization information;

at least one receiver coupled to the plurality of antennas and configured to receive one or more measurement reports from the plurality of UEs, the one or more measurement reports indicating receive quality of at least one reference signal; and one or more processors coupled to the transmitter and the receiver and configured to determine that at least one UE of the plurality of UEs is a sector edge UE located at a sector edge of one or more of the sectors, based on the one or more measurement reports, and assign, based on the determining, the sector edge UE to a sector having a higher receive quality of the at least one reference signal, and selectively mute at least one reference signal to reduce interference for one or more sector edge UEs served by adjacent sectors, the one or more sector edge UEs being located at a sector edge.

* * * * *